United States Patent
Houjo et al.

(10) Patent No.: US 8,318,861 B2
(45) Date of Patent: Nov. 27, 2012

(54) RUBBER COMPOSITION AND TIRE USING THE SAME

(75) Inventors: Masahiro Houjo, Kodaira (JP);
Masayuki Hashimoto, Kodaira (JP);
Shigeki Kamo, Kodaira (JP); Seiichi Kato, Kodaira (JP); Masaki Toyoda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 88 days.

(21) Appl. No.: 12/522,424

(22) PCT Filed: Jan. 11, 2008

(86) PCT No.: PCT/JP2008/050299
§ 371 (c)(1),
(2), (4) Date: Jul. 8, 2009

(87) PCT Pub. No.: WO2008/084860
PCT Pub. Date: Jul. 17, 2008

(65) Prior Publication Data
US 2010/0113703 A1   May 6, 2010

(30) Foreign Application Priority Data

| Jan. 11, 2007 | (JP) | 2007-003415 |
| Jan. 11, 2007 | (JP) | 2007-003451 |
| Jan. 11, 2007 | (JP) | 2007-003502 |
| Jan. 19, 2007 | (JP) | 2007-010637 |
| Feb. 27, 2007 | (JP) | 2007-047712 |

(51) Int. Cl.
C08L 21/00 (2006.01)
C08L 25/06 (2006.01)
C08L 9/00 (2006.01)
C08L 45/00 (2006.01)
C08L 57/00 (2006.01)
C08L 65/00 (2006.01)
B60C 1/00 (2006.01)
C08K 3/04 (2006.01)

(52) U.S. Cl. ........ 525/191; 525/211; 525/232; 525/240; 525/241

(58) Field of Classification Search ............... 525/191, 525/211, 232, 240, 241
See application file for complete search history.

(56) References Cited

U.S. PATENT DOCUMENTS 6,357,499 B1 * 3/2002 Kralevich et al. .......... 152/209.1
6,489,389 B1 * 12/2002 Ohta et al. ................... 524/437

FOREIGN PATENT DOCUMENTS

| EP | 1514901 A1 | 3/2005 |
| EP | 1652878 A1 | 5/2006 |
| JP | 62-001735 A | 1/1987 |
| JP | 05-009336 A | 1/1993 |
| JP | 05-009338 A | 1/1993 |
| JP | 09-012784 A | 1/1997 |
| JP | 2006-249230 A | 9/2006 |
| WO | 2004/000931 A1 | 12/2003 |

OTHER PUBLICATIONS

The State Intellectual Property Office of P.R. China, "Second Office Action," issued in connection with Chinese Patent Application No. 200880002192.2, dated Jun. 11, 2012.

* cited by examiner

*Primary Examiner* — Nathan M Nutter
(74) *Attorney, Agent, or Firm* — Sughrue Mion, PLLC

(57) ABSTRACT

This invention relates to a rubber composition capable of using in a tread rubber of a tire to improve both an initial gripping performance and a running stability of the tire as compared with those of conventional tires, and more particularly to a rubber composition formed by compounding an indene-containing $C_9$-based resin having a softening point of 130° C.-190° C. and an indene content of 30-80 mass % into a rubber component.

22 Claims, No Drawings

US 8,318,861 B2

RUBBER COMPOSITION AND TIRE USING THE SAME

TECHNICAL FIELD

This invention relates to a rubber composition and a tire using the same, and more particularly to a rubber composition capable of using in a tread rubber of a tire to improve both of an initial gripping performance and a running stability of a tire as compared with conventional tires and a tire using such a rubber composition in a tread rubber.

RELATED ART

A tread of a high-performance tire used in racing and the like is desired to keep an excellent steering stability (dry gripping property) on a dry road surface from a start to an end of the running. Therefore, it has hitherto been examined to compound an oil component including a low softening point resin and a liquid polymer, a softening agent developing effects at a lower temperature and so on into a rubber composition used in a tread rubber for the purpose of improving the dry gripping property (initial gripping performance) in such an initial running stage that the tire is at a relatively low temperature.

For example, a rubber composition compounded with a $C_9$ aromatic resin and the like is disclosed in JP-A-H05-9336, in which a $C_9$ aromatic resin having a softening point of not higher than 140° C. is compounded into this composition considering the dispersibility of the resin during the milling. Also, a rubber composition compounded with an aromatic vinyl compound is disclosed in JP-A-H10-195238 and JP-A-H10-195242, in which a resin having a softening point of not higher than 140° C. is compounded.

However, when a tire is manufactured by compounding such a resin having a low softening point to prepare a rubber composition and using the rubber composition in a tread rubber, the initial gripping performance is improved, but the gripping performance lowers as the temperature of the tire tread rises during the running. On the other hand, when a high softening point resin such as $C_9$ resin or the like is compounded alone into the rubber composition for improving the gripping performance of the tire (running stability) in the rising of the tire temperature during the running, the initial gripping performance of the tire on a low-temperature road surface lowers largely.

As a method for solving such problems is considered a method wherein both of a high softening point resin and a low softening point resin are compounded into the rubber composition. However, a total amount of the resins compounded has an influence on temperature characteristics of the rubber composition, so that the amount of the resins compoundable into the rubber composition is restricted. As a result, the tire obtained by this method is middle in both of the initial gripping performance and the running stability. Therefore, it is required to provide a rubber composition used in the tread rubber of the tire capable of simultaneously establishing the initial gripping performance and the running stability of the tire at a higher level.

SUMMARY OF THE INVENTION

The inventors have examined how to deteriorate the gripping performance during the running of a tire using a rubber composition compounded with a low softening point resin and having a good initial gripping performance as a tread rubber, and found that the degree of deteriorating the gripping performance is largely changed by a road surface temperature even on the same road course. That is, it has been found that the running stability of the tire hardly lowers under a condition that the road surface temperature is not higher than 10° C., whereas the running stability of the tire easily lowers under a condition that the road surface temperature exceeds 40° C.

Also, it has been found that when a vehicle provided with a tire using the above rubber composition in a tread rubber is run on a circuit course with a road surface temperature of 42° C., as an internal temperature of the tire is measured in the running, the internal temperature of the tire rises to 100° C.-110° C. after the running of about 10 laps. Since the measurement on the internal temperature of the tire is carried out after the vehicle goes back to a garage, it is anticipated that the internal temperature during the running becomes further higher. The rubber composition compounded with the low softening point resin is large in the deterioration of dynamic modulus (E') above 100° C., so that there is feared that when the interior temperature of the tire obtained by using such a rubber composition in the tread rubber becomes higher, the rubber composition is softened together with the resin to deteriorate the running stability.

It is, therefore, an object of the invention to provide a rubber composition capable of using in a tread rubber of a tire to improve both of the initial gripping performance and running stability of the tire as compared with the conventional tires and a tire using such a rubber composition in a tread rubber.

The inventors have made various studies on a rubber composition having an effect of lowering E' at room temperature and compounded with a resin having a high E' at a high temperature for achieving the above object and found that a rubber composition for use in a tread rubber capable of manufacturing a tire having both initial gripping performance and running stability higher than those of the conventional tire can be produced by compounding an indene-containing $C_9$-based resin into the rubber composition, and as a result the invention has been accomplished.

That is, the rubber composition of the invention is characterized by compounding an indene-containing $C_9$-based resin having a softening point of 130° C.-190° C. and an indene content of 30-80 mass % into a rubber component. The indene content is preferable to be 45-75 mass %.

In the rubber composition of the invention, the softening point of the indene-containing $C_9$-based resin is preferable to be a range of 140-180° C. As the indene-containing $C_9$-base resin is particularly preferable α-methylstyrene-vinyl toluene-indene copolymer having a softening point of 155-180° C.

In another preferable embodiment of the rubber composition of the invention, the indene-containing $C_9$-based resin is compounded in an amount of 5-80 parts by mass per 100 parts by mass of the rubber component.

In the other preferable embodiment of the rubber composition of the invention, the indene-containing $C_9$-based resin includes a $C_5$ component. The content of the $C_5$ component in the indene-containing $C_9$-based resin is preferably a range of 0.5-20 mass %, more preferably a range of 1-10 mass %.

The rubber composition of the invention is preferable to further include at least one resin selected from homopolymer resin and copolymer resin of an aromatic vinyl compound having a softening point of not lower than 135° C.

Also, the rubber composition of the invention is preferable to further include at least one resin having a softening point of not lower than 120° C. selected from hydrogenated petroleum resins obtained by partially or fully hydrogenating a petroleum resin comprising $C_5$ component and/or $C_9$ component. The softening point is more preferable to be not lower than 130° C.

Furthermore, the rubber composition of the invention is preferable to include at least one resin selected from hydrogenated terpene resins having a softening point of not lower than 130° C. by partially or fully hydrogenating terpene resin. The hydrogenated terpene resin is preferable to have a softening point of not lower than 140° C.

The rubber composition of the invention is also preferable to further include at least one resin selected from terpene homopolymer resin and terpene-phenol copolymer resin. The at least one resin selected from terpene homopolymer resin and terpene-phenol copolymer resin is preferable to have a softening point of not lower than 140° C.

Furthermore, the rubber composition of the invention is preferable to include one or more resins (A) selected from alkylphenolic resins and at least one resin (B) selected from selected from terpene homopolymer resin and terpene-phenol copolymer resin. In this case, the resin (A) and the resin (B) are preferable to be compounded in a mass ratio of 10:1-1:10. Also, the total amount of the resin (A) and the resin (B) compounded is preferable to be a range of 3-100 parts by mass per 100 parts by mass of the rubber component. Further, a main structure in phenol site of the resin (A) is preferable to be p-tert-butyl phenol structure. In addition, the resin (B) includes at least the terpene-phenol copolymer resin, wherein OH value of the terpene-phenol copolymer resin is preferably not more than 170. Moreover, the resin (A) is preferable to have a softening point of not lower than 120° C.

In the other preferable embodiment of the rubber composition of the invention, the rubber component includes not less than 70 mass % of a butadiene-based copolymer having not less than 10% of a vinyl content in butadiene portion. In this case, the butadiene-based copolymer is preferable to comprise styrene-butadiene copolymer. Also, the styrene-butadiene copolymer is preferable to have a styrene content of 20-70 mass %.

Further, the rubber composition of the invention is preferable to include 60-200 parts by mass of carbon black per 100 parts by mass of the rubber component.

Moreover, the tire of the invention is characterized by using a rubber composition as described in any one of the above items in a tread rubber.

The invention can provide a rubber composition capable of using in a tread rubber of a tire to further improve both of initial gripping performance and running stability of the tire as compared with the conventional tires and a tire using such a rubber composition in a tread rubber.

BEST MODE FOR CARRYING OUT THE INVENTION

The rubber composition according to the invention is a rubber composition formed by compounding an indene-containing $C_9$-based resin into a rubber component, characterized in that the indene-containing $C_9$-based resin has a softening point of 130° C.-190° C. and an indene content is 30-80 mass %. By using the rubber composition compounded with the indene-containing $C_9$-based resin in a tread rubber of a tire can be further improved both the initial gripping performance and the running stability of the tire as compared with the conventional tires. The indene-containing $C_9$-based resin has preferably a softening point of 140-180° C., more preferably 155-180° C. When an indene-containing $C_9$-based resin having a softening point of lower than 130° C. is compounded into the rubber composition, the running stability of the tire may not be improved. Considering the dispersibility of the resin during the milling, the softening point is preferably not higher than 190° C. Further, the indene content of the indene-containing $C_9$-based resin is preferable to be 45-75 mass %. In the indene-containing $C_9$-based resin, when the indene content is less than 30 mass %, the running stability is lacking, while when it exceeds 80 mass %, the initial gripping performance can not be ensured.

The indene-containing $C_9$-base resin means a resin containing indene in a starting monomer. As a monomer other than indene are mentioned vinyl toluene, α-methylstyrene, cumarone and the like. As the $C_9$-based resin are mentioned vinyl toluene-α-methylstyrene-indene resin, vinyl toluene-indene resin, α-methylstyrene-indene resin and so on.

As the $C_9$-based resin is particularly preferable α-methylstyrene-vinyl toluene-indene copolymer resin having a softening point of not lower than 155° C. but not higher than 180° C. When the $C_9$-based resin is α-methylstyrene-vinyl toluene-indene copolymer resin, the running stability at a higher temperature is ensured, but if the softening point is lower than 155° C., the effect of improving the running stability at the high temperature is small, while if the softening point exceeds 180° C., the dispersibility of the resin in the rubber component lowers and the fracture properties of the rubber composition are deteriorated.

In the rubber composition according to the invention, the amount of the indene-containing $C_9$-based resin compounded is preferably 5-80 parts by mass, more preferably 5-60 parts by mass per 100 parts by mass of the rubber component. The amount of the resin compounded is required to be not less than 5 parts by mass per 100 parts by mass of the rubber component for giving the characteristics of the resin to the rubber composition, but when it exceeds 80 parts by mass, the rubber composition is cured at a lower temperature.

In the rubber composition according to the invention, the indene-containing $C_9$-base resin is preferable to include a $C_5$ component. The dispersibility of the indene-containing $C_9$-based resin into rubber can be improved by including the $C_5$ component. As the $C_5$ component are mentioned olefinic hydrocarbons such as pentene (1), 2-pentene (2), 2-methylbutene (1), 3-methylbutene (1) and the like, diolefinic hydrocarbons such as 2-methylbutadiene (1,3), pentadiene (1,3), cyclopentadiene, pentadiene (1,2) and the like. Among them, the diolefinic hydrocarbon is preferable, and cyclopentadiene is more preferable.

Also, in the rubber composition according to the invention, the content of the $C_5$ component in the indene-containing $C_9$-based resin is preferably 0.5-20 mass %, more preferably 1-10 mass %. When the content of the $C_5$ component in the indene-containing $C_9$-based resin is less than 0.5 mass %, the dispersibility of the resin becomes poor, while when it exceeds 20 mass %, the running stability is damaged.

Furthermore, the rubber composition according to the invention is preferable to include at least one resin selected from homopolymer resin and copolymer resin of an aromatic vinyl compound having a softening point of not lower than 135° C. When a resin having a softening point of lower than 135° C. is compounded, the running stability of the tire is damaged. Also, considering the dispersibility in the milling, the softening point of the above resin is preferable to be not higher than 180° C. The amount of the resin compounded is required to be not less than 10 parts by mass per 100 parts by mass of the rubber component for giving the characteristics of the resin to the rubber composition, but when it exceeds 60 parts by mass, the rubber composition is cured at a lower temperature. As the homopolymer resin or copolymer resin of the aromatic vinyl compound having a softening point of not lower than 135° C. are mentioned α-methylstyrene homopolymer resin, α-methylstyrene-styrene copolymer resin, α-methylstyrene-vinyl toluene copolymer resin and so on. These resins may be compounded alone or in a combination of two or more.

Moreover, the rubber composition according to the invention is preferable to include at least one resin selected from hydrogenated petroleum resins having a softening point of not lower than 120° C. by partially or fully hydrogenating a petroleum resin comprising $C_5$ component and/or $C_9$ component, and the hydrogenated petroleum resin formed by partially or fully hydrogenating the petroleum resin comprising $C_5$ component and/or $C_9$ component is more preferable to have a softening point of not lower than 130° C. When a resin having a softening point of lower than 120° C. is compounded, the running stability of the tire is damaged. Also, considering the dispersibility in the milling, the softening point of the resin is preferable to be not higher than 180° C. The amount of the resin compounded is required to be not less than 10 parts by mass per 100 parts by mass of the rubber component for giving the characteristics of the resin to the rubber composition, but when it exceeds 80 parts by mass, the rubber composition is cured at a lower temperature. As the hydrogenated petroleum resin having a softening point of not lower than 120° C. by partially or fully hydrogenating the petroleum resin comprising $C_5$ component and/or $C_9$ component are mentioned ARUKON P125 (softening point: 125° C.) made by Arakawa Chemical Industries, Ltd., I-MARV Y135 made by Idemitsu Kosan Co., Ltd., ARUKON M135 (softening point: 135° C.) made by Arakawa Chemical Industries, Ltd., I-MARV P140 (softening point: 140° C.) made by Idemitsu Kosan Co., Ltd., ARUKON P140 (softening point: 140° C.) made by Arakawa Chemical Industries, Ltd., and so on. They may be compounded into the rubber composition alone or in a combination of two or more.

In addition, the rubber composition according to the invention is preferable to include at least one resin selected from hydrogenated terpene resins having a softening point of not lower than 130° C. by partially or fully hydrogenating terpene resin. Although a certain effect is obtained even by compounding the indene-containing C9-based resin into the rubber composition alone, the effect of improving the running stability of the tire can be largely improved by further compounding the hydrogenated terpene resin. If a hydrogenated terpene resin having a softening point of lower than 130° C. is compounded, the initial gripping performance of the tire is improved, but the running stability is damaged. From a viewpoint of the running stability, the softening point of the hydrogenated terpene resin is preferably not lower than 140° C. The amount of the resin compounded is required to be not less than 10 parts by mass per 100 parts by mass of the rubber component for giving the characteristics of the resin to the rubber composition, but when it exceeds 60 parts by mass, the rubber composition is cured at a lower temperature.

In the rubber composition according to the invention is preferably compounded at least one selected from homopolymer of terpene having a softening point of not lower than 130° C. and terpene-phenol copolymer resin for balacendly providing both the gripping performance and workability at a higher level. Moreover, the softening point of such a resin is preferably not lower than 140° C. Also, the amount of this resin compounded is preferably a range of 10-100 parts by mass per 100 parts by mass of the rubber component. When the amount of the resin is less than 10 parts by mass per 100 parts by mass of the rubber component, the desired effects can not be obtained, while when it exceeds 100 parts by mass, the performances of the rubber composition are not improved and the milling workability is considerably deteriorated, and also the curing is caused at a low temperature after the vulcanization to deteriorate the workability. From a viewpoint of the workability and the like, the amount of the resin compounded into the rubber composition is preferable to be 20-80 parts by mass. A terpene monomer as a starting material for the resin is not particularly limited, and preferably includes monoterpene hydrocarbons such as α-pinene, limonene and the like. From a viewpoint of the gripping performance and workability, monomers inclusive of α-pinene are more preferable, and α-pinene is most preferable. The softening point of such a resin is preferably not higher than 190° C. considering the dispersibility of the resin in the milling. Furthermore, it is preferable to include at least one resin selected from terpene homopolymer resin and terpene-phenol copolymer resin, and the softening point of the terpene homopolymer resin and terpene-phenol copolymer resin is more preferable to be not lower than 140° C.

Also, the rubber composition according to the invention is preferable to include at least one resin (A) selected from alkylphenol resins and at least one resin (B) selected from terpene homopolymer resin and terpene-phenol copolymer resin. When the rubber composition further including at least one resin (A) selected from alkylphenol resins and at least one resin (B) selected from terpene homopolymer resin and terpene-phenol copolymer resin is used in a tread rubber of a tire, a high gripping performance can be highly enhanced more than ever before without deteriorating the operability at a low temperature and wear resistance of the tire. Moreover, both the resin (A) and the resin (B) are preferably compounded, while if only one of the resins is compounded, the desired effects aiming at the invention can not be obtained.

Preferably, the resin (A) and the resin (B) are compounded in a mass ratio of 10:1-1:10. When the compounding ratio is outside the range of 10:1-1:10, the desired effects aiming at the invention can not be obtained sufficiently.

Further, the total amount of the resin (A) and resin (B) is preferably 3-100 parts by mass, more preferably 3-90 parts by mass, most preferably 3-80 parts by mass per 100 parts by mass of the rubber component. When the total amount is less than 3 parts by mass, the desired effects aiming at the invention can not be obtained sufficiently, while when it exceeds 100 parts by mass, the target performances are not obtained sufficiently, but also there is a fear of badly affecting properties after the vulcanization.

As to the resin (A) selected from the alkylphenol resins, a starting monomer is desirable to be tert-butylphenol or tert-octylphenol, and p-tert-butylphenol-formaldehyde resin and p-tert-butylphenol-acetoaldehyde resin are more preferable. In order to obtain the desired effect of the invention, the softening point of the alkylphenol resin is preferably not lower than 120° C., more preferably 120-160° C. When the softening point is lower than 120° C., the running stability lowers, while when it exceeds 160° C., since the polarity of the resin is high, the resin is not uniformly dispersed in the milling and the wear resistance is considerably deteriorated. The alkylphenol resins may be used alone or in a combination of two or more.

As to the one or more resins (B) selected from the terpene resin and the terpene-phenol copolymer resin, the starting terpene may be α-pinene, β-pinene, dipentene, and limonene. Also, OH value of the terpene-phenol copolymer resin is preferably not more than 170 for obtaining the desired effects of the invention. The terpene resins and terpene-phenol copolymer resins my be used alone or in a combination of two or more.

Moreover, the rubber component in the rubber composition of the invention is not particularly limited, but may include diene-based rubbers such as natural rubber, polybutadiene rubber, polyisoprene rubber, ethylene-propylene copolymer, isobutylene-isoprene copolymer, polychloroprene and the like in addition to the aforementioned butadiene copolymer.

In the rubber composition of the invention, the rubber component is preferable to comprise not less than 70% by mass of butadiene copolymer having a vinyl bond content in butadiene portion of not less than 10%. When the vinyl bond content in butadiene portion is less than 10%, the rigidity of the rubber composition at a high temperature region lowers and the desired effects are not obtained, while when the content of the butadiene copolymer in the rubber component is less than 70% by mass, the basic heat resistance as the rubber composition largely lowers.

Also, the butadiene copolymer in the rubber composition of the invention is preferable to include styrene-butadiene copolymer. When the butadiene copolymer includes the styrene-butadiene copolymer, the hysteresis loss of the rubber composition is improved and the gripping performance is improved. The styrene-butadiene copolymer may be synthesized by any synthesis methods such as emulsion polymerization, solution polymerization and the like. As the butadiene copolymer other than styrene-butadiene copolymer are mentioned acrylonitrile-butadiene copolymer and so on.

The styrene-butadiene copolymer is preferable to have a styrene content of 20-70 mass %. When the styrene content is less than 20 mass %, the desired gripping performances of the tire at low and high temperatures can not be obtained, while when the styrene content exceeds 70 mass %, the block rigidity becomes excessively high and the biting of rubber into road surface is less and hence the desired gripping performance of the tire can not be obtained. Since the gripping performance of the tire is remarkably increased, the styrene content of the styrene-butadiene copolymer is more preferably 20-45 mass %.

In the rubber composition of the invention is preferably compounded carbon black in an amount of 60-200 parts by mass per 100 parts by mass of the rubber component. When the amount of carbon black compounded into the rubber composition is less than 60 parts by mass, the contribution to the improvement of dry gripping property of the tire is not sufficient, while when it exceeds 200 parts by mass, the wear resistance of the tire is deteriorated and further the processability is extremely deteriorated. The amount of carbon black compounded into the rubber composition is more preferably 70-140 parts by mass. The carbon black is preferable to have a nitrogen adsorption specific area of about 80-280 $m^2/g$. When the nitrogen adsorption specific area of carbon black is less than 80 $m^2/g$, the sufficient elastic modulus is not obtained and the wear resistance is deteriorated, while when it exceeds 280 $m^2/g$, the improvement of gripping force and wear resistance is not expected and also the milling workability is deteriorated. As an example of the carbon black are mentioned HAF, ISAF, SAF and the like, but SAF is preferable from a point that the wear resistance and the gripping performance are established simultaneously. The carbon blacks may be used alone or in a combination of two or more, and commercially available ones can be used preferably.

In addition to the above rubber component, resin components and carbon black, the rubber composition may be properly compounded with additives usually used in rubber industry such as process oil or the like, vulcanizing agent, vulcanization accelerator, antioxidant, softening agent, zinc oxide, stearic acid and so on without damaging the object of the invention. As the additive may be preferably used commercially available ones.

The oil such as process oil or the like is not particularly limited, and may be properly selected and used in accordance with the use purpose. As the oil are mentioned aromatic oil, naphthenic oil, paraffinic oil, ester oil, liquid conjugated diene rubber, liquid hydrogenated conjugated diene rubber and so on. As the oil is included in the rubber composition, the fluidity of the rubber composition can be controlled, the viscosity of the rubber composition before the vulcanization is reduced to enhance the fluidity, whereby the extremely good extrusion of the rubber composition can be advantageously conducted.

The content of the oil in the rubber composition is preferably 35-200 parts by mass, more preferably 40-150 parts by mass per 100 parts by mass of the rubber component, which includes an oil used when the rubber component is extended with an oil extender. When the oil content is less than 35 parts by mass per 100 parts by mass of the rubber component, the Moony viscosity of the uncured rubber becomes extremely high and the processability is deteriorated, and further the dry gripping property of the tire may be deteriorated, while when it exceeds 200 parts by mass, the Moony viscosity becomes extremely low and the processability is deteriorated and further the tread is too soft and hence the wear resistance may be deteriorated.

As the vulcanizing agent may be used sulfur with at least one of organic thiosulfate compounds (e.g. sodium 1,6-hexamethylene dithiosulfate dihydrate) and bismaleimide compounds (e.g. phenylene bismaleimide).

As the vulcanization accelerator are mentioned thiuram compounds such as tetrakis-2-ethylhexylthiuram disulfide, tetrakis-2-isopropylthiuram disulfide, tetrakis-dodecylthiuram disulfide, tetrakis-benzylthiuram disulfide and the like; dithiocarbamate compounds such as zinc di-2-ethylhexyl dithiocarbamate, zinc dodecyldithiocarbamate, zinc benzyldithiocarbamate and the like; benzothiazolyl vulcanization accelerators such as dibenzothiazyl disulfide, 4,4'-dimethyldibenzothiazyl disulfide, N-cyclohexyl-2-benzothiazyl-sulfenamide, N-t-butyl-2-benzothiazyl-sulfenamide, N-t-butyl-2-benzothiazyl-sulfenimide, N-oxydiethylene-benzothiazyl-sulfenamide, N,N'-dicyclohexyl-2-benzothiazyl-sulfenamide and the like.

The rubber composition according to the invention can be produced by milling the rubber component, resin and, if necessary, other additives properly selected, and warming, extruding and vulcanizing them.

The milling conditions are not particularly limited, and may properly selected under various conditions such as an amount of each component charged into a milling apparatus, a revolution velocity of a rotor, a ram pressure, a milling temperature, a kind of a milling apparatus and the like. As the milling apparatus are mentioned a Banbury mixer, an intermix, kneader and the like, which are generally used in the milling of the rubber composition.

The warming condition is not particularly limited, and may be properly selected under various conditions such as a warming temperature, a warming time, a warming apparatus and the like in accordance with the use purpose. As the warming apparatus is mentioned a rolling machine or the like usually used for warming the rubber composition.

The extrusion conditions are not particularly limited, and may be properly selected in accordance with various conditions such as extrusion time, extrusion rate, extrusion apparatus, extrusion temperature and the like. As the extrusion apparatus are mentioned an extruder and so on usually used for extruding the rubber composition for tire. The extrusion temperature can be determined properly.

The apparatus, system, conditions and so on for vulcanization are not particularly limited and may be properly selected in accordance with the use purpose. As the apparatus for vulcanization are mentioned a mold-vulcanizing machine with a mold usually used for vulcanizing the rubber composition for tire and the like. The vulcanizing temperature is typically about 100-about 190° C.

The rubber composition of the invention is preferable to be used in a tread rubber of a tire, particularly in a tread rubber of a tire for a high-speed racing vehicle used in the running on a circuit course or the like. Moreover, well-known members may be used as a tire member other than the tread rubber. As a gas to be filled in the tire may be used an inert gas of nitrogen, argon, helium or the like in addition to usual air or air having a regulated oxygen partial pressure.

As an example of the tire construction according to the invention is mentioned a tire comprising a pair of bead portions, a carcass toroidally extending between the bead portions, a belt hooping a crown part of the carcass and a tread. Moreover, the tire according to the invention may have a radial structure or a bias structure.

A tread structure in the tire according to the invention is not particularly limited, and may be one-layer structure or a multi-layer structure or a so-called cap-base structure constituted with an upper-layer cap portion directly contacting with a road surface and a lower-layer base portion disposed adjacent to an inside of the cap portion. In the invention, it is preferable that at least the cap portion is made from the above rubber composition.

The tire according to the invention can be manufactured as follows though the production method is not particularly limited. That is, the rubber composition according to the invention is first prepared and then the rubber composition is attached onto an uncured base portion previously applied to a crown part of a green tire casing. Thereafter, the tire can be manufactured by building the green tire under vulcanization in a given mold under given temperature and pressure.

EXAMPLES

The invention will be further described concretely with reference to the following examples, but is not limited to these examples and various modifications may be properly conducted without departing from the scope of the invention.

<Dynamic Modulus E' (MPa)>

The resulting rubber composition is vulcanized at 145° C. for 45 minutes, and a constant stress of the resulting vulcanizate is measured with a flexometer of JIS K6265 to determine a tire until cracks are caused in an interior of a sample as a time durable to thermal fatigue. The data are represented by an index value on the basis that Comparative Example 1 is 100.

<dry gripping property>

The tire to be tested is mounted on a high-performance vehicle capable of running at a maximum speed of 300 km/h and run on a circuit course, during which a test driver's feeling on an initial gripping in the first lap (initial gripping performance and an end-stage gripping in the twelfth lap (running stability) is evaluated according to the following standard. The larger the positive numerical value, the better the dry gripping property.

+3: degree capable of clearly recognizing the difference by a general driver having a low driving frequency +2: degree capable of clearly recognizing the difference by a general driver having a high driving frequency +1: degree capable of recognizing the difference by a professional driver 0: control −1: degree capable of recognizing the difference by a professional driver −2: degree capable of clearly recognizing the difference by a general driver having a high driving frequency −3: degree capable of clearly recognizing the difference by a general driver having a low driving frequency <Resistance to Thermal Fatigue>

The tire to be tested is mounted on a racing vehicle and run on a circuit course and then the interior and exterior of the tire after the running are observed to evaluate according to the following standard.

○: state of causing no chunk

−1: state of existing cracks of less than 0.5 mm in the interior of the tire

−2: state of existing cracks of not less than 0.5 mm in the interior of the tire −3: state of existing cracks on the exterior <Hysteresis Property>

With respect to a vulcanized rubber obtained by vulcanizing each rubber composition is measured tan δ at 50° C. under a dynamic strain of 1% with a viscoelasticity measuring machine made by Rheometric Co., Ltd., which is represented by an index on the basis that tan δ of the rubber composition in Comparative Example 1 is 100. The larger the index value, the larger the tan δ and the better the gripping performance.

<Dry Skid Property>

It is evaluated on a dry road surface with a skid tester (made by Stanley London) and represented by an index on the basis that Comparative Example 1 is 100. The larger the index value, the better the property.

<Gripping Property>

The gripping property of the rubber composition is evaluated by duplicating a dry road surface with a dry skid tester. Also, the gripping property of the tire is evaluated by using the rubber composition in a tread to prepare a tire having a tire size of 225/40R18. the four tires are mounted onto a passenger car and run on a test course of a dry asphalted road surface to evaluate the gripping property by a test driver at the following 7 stages:

7: very good, 6: good, 5: slightly good, 4: common, 3: slightly bad, 2: bad, 1: extremely bad, −: not evaluated (Comparative Examples 1-5 and Examples 1-13)

A rubber composition is prepared by milling components according to a compounding recipe shown in Table 1 in a Banbury mixer. A tire to be tested is prepared by using the rubber composition to form a tread of a passenger car tire (size: 225/40R18). Thereafter, the dry gripping property and so on are evaluated by the above methods with respect to the resulting rubber compositions and tires to be tested. The results are shown in Table 1.

[Table 1]

TABLE 1

|  |  | Comparative Example 1 | Example 1 | Example 2 | Comparative Example 2 | Comparative Example 3 | Example 3 | Example 4 | Example 5 | Comparative Example 4 |
|---|---|---|---|---|---|---|---|---|---|---|
| Compounding recipe | SBR *1 | 135 | 135 | 135 | 135 | 135 | 135 | 135 | 135 | 135 |
|  | SBR *2 |  |  |  |  |  |  |  |  |  |
|  | carbon black *3 | 80 | 80 | 80 | 80 | 80 | 80 | 80 | 80 | 80 |
|  | aromatic oil *4 | 15 | 15 | 15 | 15 | 15 | 15 | 15 | 15 | 15 |
|  | zinc oxide | 3 | 3 | 3 | 3 | 3 | 3 | 3 | 3 | 3 |
|  | stearic acid | 2 | 2 | 2 | 2 | 2 | 2 | 2 | 2 | 2 |
|  | wax *5 | 1.5 | 1.5 | 1.5 | 1.5 | 1.5 | 1.5 | 1.5 | 1.5 | 1.5 |
|  | antioxidant *6 | 2 | 2 | 2 | 2 | 2 | 2 | 2 | 2 | 2 |
|  | resin A *7 | 50 |  | 25 |  |  |  |  |  |  |
|  | resin B *8 |  |  |  | 50 |  | 40 | 30 | 20 | 40 |
|  | resin C *9 |  |  |  |  | 50 |  |  |  |  |
|  | resin D *10 |  | 50 | 25 |  |  | 10 | 20 | 30 |  |
|  | resin E *11 |  |  |  |  |  |  |  |  | 10 |
|  | resin F *12 |  |  |  |  |  |  |  |  |  |
|  | resin G *13 |  |  |  |  |  |  |  |  |  |
|  | vulcanization accelerator A(CZ) *14 | 1 | 1 | 1 | 1 | 1 | 1 | 1 | 1 | 1 |
|  | vulcanization accelerator B(TBzTD) *15 | 1 | 1 | 1 | 1 | 1 | 1 | 1 | 1 | 1 |
|  | sulfur | 2 | 2 | 2 | 2 | 2 | 2 | 2 | 2 | 2 |
| Property of rubber composition | E' at 120° C. (index) | 100 | 150 | 103 | 116 | 118 | 128 | 132 | 135 | 145 |
| Dry gripping property | initial gripping performance | 3 | −3 | 3 | 2 | 2 | 2 | 2 | 1 | −2 |
|  | running stability | −3 | 3 | −1 | −2 | −2 | 1 | 2 | 3 | 1 |

|  |  | Example 6 | Example 7 | Example 8 | Example 9 | Comparative Example 5 | Example 10 | Example 11 | Example 12 | Example 13 |
|---|---|---|---|---|---|---|---|---|---|---|
| Compounding recipe | SBR *1 |  |  |  |  | 135 | 135 | 135 | 135 | 135 |
|  | SBR *2 | 150 | 150 | 150 | 150 |  |  |  |  |  |
|  | carbon black *3 | 70 | 70 | 100 | 120 | 80 | 80 | 80 | 80 | 80 |
|  | aromatic oil *4 |  |  | 30 | 50 | 15 | 15 | 15 | 15 | 15 |
|  | zinc oxide | 3 | 3 | 3 | 3 | 3 | 3 | 3 | 3 | 3 |
|  | stearic acid | 2 | 2 | 2 | 2 | 2 | 2 | 2 | 2 | 2 |
|  | wax *5 | 1.5 | 1.5 | 1.5 | 1.5 | 1.5 | 1.5 | 1.5 | 1.5 | 1.5 |
|  | antioxidant *6 | 2 | 2 | 2 | 2 | 2 | 2 | 2 | 2 | 2 |
|  | resin A *7 |  |  |  |  |  |  |  |  |  |
|  | resin B *8 | 20 | 30 | 30 | 30 |  |  | 30 |  | 30 |
|  | resin C *9 |  |  |  |  |  |  |  |  |  |
|  | resin D *10 | 20 | 10 | 10 | 10 |  |  |  |  |  |
|  | resin E *11 |  |  |  |  | 50 |  |  |  |  |
|  | resin F *12 |  |  |  |  |  | 50 | 20 |  |  |
|  | resin G *13 |  |  |  |  |  |  |  | 50 | 20 |
|  | vulcanization accelerator A(CZ) *14 | 1 | 1 | 1 | 1 | 1 | 1 | 1 | 1 | 1 |
|  | vulcanization accelerator B(TBzTD) *15 | 1 | 1 | 1 | 1 | 1 | 1 | 1 | 1 | 1 |
|  | sulfur | 2 | 2 | 2 | 2 | 2 | 2 | 2 | 2 | 2 |
| Property of rubber composition | E' at 120° C. (index) | 131 | 126 | 126 | 119 | 180 | 158 | 135 | 146 | 129 |

TABLE 1-continued

| Dry gripping property | initial gripping performance | 1 | 3 | 3 | 2 | −3 | −3 | 1 | −2 | 1 |
|---|---|---|---|---|---|---|---|---|---|---|
| | running stability | 3 | 1 | 2 | 2 | −3 | 2 | 2 | 2 | 2 |

*1: 0120 made by JSR Corporation (styrene content: 35%, vinyl bond content: 16%, 35% aromatic oil extended)
*2: TAFDEN 4350 made by Asahi Chemical Industry Co., Ltd. (styrene content: 39%, vinyl bond content: 38%, 50% aromatic oil extended)
*3: SAF ($N_2SA$: 150 $m^2/g$)
*4: FUCOL AROMATICS #3 made by Fuji Kosan Co., Ltd.
*5: microcrystalline wax made by Seiko Chemical Co., Ltd.
*6: N-(1,3 -dimethylbutyl)-N'-phenyl-p-phenylene diamine made by Ouchi Shinko Chemical Industrial Co., Ltd.
*7: FTR0120 made by Mitsui Chemicals, Inc. softening point: 120° C., indene content: 0 mass %,
*8: FTR0140 made by Mitsui Chemicals, Inc. softening point: 140° C., indene content: 0 mass %,
*9: FTR2140 made by Mitsui Chemicals, Inc. softening point: 140° C., indene content: 0 mass %,
*10: NEOPOLYMER170S made by Nippon Petrochemicals Co., Ltd. α-methylstyrene-vinyl toluene-indene copolymer resin, softening point: 160° C., indene content: 70 mass %
*11: NOBARES C150 made by Rutgers Chemicals Co., Ltd. cumarone-indene resin, softening point: 150° C., indene content: 90 mass %
*12: NOBARES TN170 made by Rutgers Chemicals Co., Ltd. $C_9$ resin, softening point: 170° C., indene content: 70 mass %
*13: TOHOHIGHRESIN 150 made by Toho Chemical Industry Co., Ltd. indene-containing $C_9$ resin including $C_5$ component, softening point: 150° C., indene content: 55 mass %, $C_5$ component content: 5 mass %
*14: N-cyclohexyl-2-benzothiazolyl sulfenamide made by Ouchi Shinko Chemical Industrial Co., Ltd.
*15: tetrakis-benzylthiuram disulfide made by Flexsys The results measured on E' at 120° C. are represented by an index on the basis that a case using only α-methylstyrene resin having a softening point of 120° C. per 135 parts by mass of SBR having a styrene content of 35% and a vinyl bond content of 16% (Comparative Example 1) is 100. In the compounding of Comparative Example 1, the initial dry gripping property is very good, but the running stability is low. On the contrary, when using an indene-containing $C_9$ resin having a softening point of 170° C. (Example 1), E' at 120° C. is 150 and the running stability is considerably improved.

On the other hand, in case of compounding only α-methylstyrene resin having a softening point of 140° C. (Comparative Example 2) or 140° C. (Comparative Example 3), E' at 120° C. is improved (Comparative Examples 4, 5), and the running stability is improved while maintaining the initial gripping performance (Comparative Example 4). When $C_9$ resin having a softening point of 170° C. is further compounded to the compounding of Comparative Example 4, the running stability is largely improved without damaging the initial dry gripping property (Examples 3-5). The similar effect is confirmed even in case of compounding α-methylstyrene-vinyl toluene-indene copolymer resin having a softening point of 160° C. (Comparative Example 4).

Even when both α-methylstyrene resin having a softening point of 140° C. and C9 resin having a softening point of 170° C. are compounded to 150 parts by mass of SBR having a styrene content of 39% and a vinyl bond content of 38% likewise Examples 3-5, E' at 120° C. is improved (Examples 6, 7), and the running stability is largely improved without damaging the initial dry gripping property (Example 6). Also, when the amounts of carbon black and aromatic oil compounded to Example 7 are increased to 100 parts by mass and 30 parts by mass (Example 8) and 120 parts by mass and 50 parts by mass (Example 9), respectively, E' at 120° C. is improved (Examples 8, 9), and the running stability is largely improved without damaging the initial dry gripping property (Example 9). E' at 120° C. is higher in Example 8 than Example 10.

In Comparative Example 5 that cumarone-indene resin is compounded into the rubber composition alone, E' at 120° C. is largely improved, but the initial gripping performance and the running stability are deteriorated considerably. On the other hand, in Example 10 that 50 parts by mass of indene-containing $C_9$ resin (indene content: 70 mass %, softening point: 170° C.) is compounded into the rubber composition, E' at 120° C. and the running stability are improved, while in Example 11 that 20 parts by mass of the indene-containing $C_9$ resin and 30 parts by mass of a resin of an aromatic vinyl compound are compounded into the rubber composition, E' at 120° C., initial gripping performance and running stability are improved simultaneously. As the rubber composition of the invention is preferable a rubber composition wherein an indene-containing $C_9$-based resin having a softening point of 130° C.-190° C. and an indene content of 30-80 mass % is compounded to the rubber component. More preferably, the amount of the indene-containing $C_9$-based resin compounded is 5-80 parts by mass per 100 parts by mass of the rubber component. Furthermore, it is more preferable to include at least one resin selected from homopolymer resin and copolymer resin of an aromatic vinyl compound having a softening point of not lower than 135° C.

In Example 12 that 50 parts by mass of the indene-containing $C_9$ resin containing $C_5$ component is compounded into the rubber composition, E' at 120° C. and the running stability are improved, while in Example 11 that 20 parts by mass of the indene-containing C9 resin containing C5 component and 30 parts by mass of a resin of an aromatic vinyl compound are compounded into the rubber composition, E' at 120° C., initial gripping performance and running stability are improved simultaneously. Therefore, as the rubber composition of the invention is preferable a rubber composition compounded with an indene-containing $C_9$-based resin having a softening point of 130° C.-190° C. and an indene content of 30-80 mass % is compounded to the rubber component. More preferably, the amount of the indene-containing $C_9$-based resin compounded is 5-80 parts by mass per 100 parts by mass of the rubber component and the content of $C_5$ component is 0.5-20 mass %. Furthermore, it is more preferable to include at least one resin selected from homopolymer resin and copolymer resin of an aromatic vinyl compound having a softening point of not lower than 135° C.

Comparative Examples 6-8 and Examples 14-20

A rubber composition is prepared by milling components according to a compounding recipe (unit: parts by mass) shown in Table 2 in a Banbury mixer. Also, a tire to be tested is prepared by using such a rubber composition to form a tread of a passenger car tire (size: 225/40R18). Thereafter, the dry gripping property and so on are evaluated by the above methods with respect to the resulting rubber compositions and tires to be tested. The results are shown in Table 2.

TABLE 2

| | | Comparative Example 6 | Example 14 | Example 15 | Comparative Example 7 | Example 16 | Example 17 | Example 18 | Comparative Example 8 | Example 19 | Example 20 |
|---|---|---|---|---|---|---|---|---|---|---|---|
| Compounding recipe | SBR *1 | 135 | 135 | 135 | 135 | 135 | 135 | 135 | 135 | 135 | 135 |
| | carbon black *3 | 80 | 80 | 80 | 80 | 80 | 80 | 80 | 80 | 80 | 80 |
| | aromatic oil *4 | 15 | 15 | 15 | 15 | 15 | 15 | 15 | 15 | 15 | 15 |
| | zinc oxide | 3 | 3 | 3 | 3 | 3 | 3 | 3 | 3 | 3 | 3 |
| | stearic acid | 2 | 2 | 2 | 2 | 2 | 2 | 2 | 2 | 2 | 2 |
| | wax *5 | 1.5 | 1.5 | 1.5 | 1.5 | 1.5 | 1.5 | 1.5 | 1.5 | 1.5 | 1.5 |
| | antioxidant *6 | 2 | 2 | 2 | 2 | 2 | 2 | 2 | 2 | 2 | 2 |
| | resin H *16 | 50 | | 40 | | | | | | | |
| | resin D *10 | | 50 | 10 | | 10 | 20 | 30 | | | |
| | resin I *17 | | | | 50 | 40 | 40 | 30 | | 30 | 30 |
| | resin J *18 | | | | | | | | 50 | | |
| | resin F *12 | | | | | | | | | 30 | |
| | resin G *13 | | | | | | | | | | 30 |
| | vulcanization accelerator A(CZ) *14 | 1 | 1 | 1 | 1 | 1 | 1 | 1 | 1 | 1 | 1 |
| | vulcanization accelerator B(TBzTD) *15 | 1 | 1 | 1 | 1 | 1 | 1 | 1 | 1 | 1 | 1 |
| | sulfur | 2 | 2 | 2 | 2 | 2 | 2 | 2 | 2 | 2 | 2 |
| Property of rubber composition | E' at 120° C. (index) | 100 | 150 | 103 | 116 | 118 | 128 | 132 | 135 | 137 | 125 |
| Actual test on vehicle | initial gripping performance | 3 | −3 | 2 | 2 | 2 | 2 | 2 | 2 | 2 | 2 |
| | running stability | −3 | 3 | −2 | −1 | 1 | 1 | 2 | 0 | 2 | 1 |

*1-15 are the same as in Table 1.
*16: ARUKON M90 made by Arakawa Chemical Industries, Ltd. partially hydrogenated petroleum resin, softening point: 90° C.
*17: I-MARV P140 made by Idemitsu Kosan Co., Ltd. hydrogenated petroleum resin, softening point: 140° C.
*18: ARUKON M135 made by Arakawa Chemical Industries, Ltd. hydrogenated petroleum resin, softening point: 135° C.

In Comparative Example 6 compounded with only the resin H having a softening point of 90° C., the initial gripping performance is very good, but the running stability is low. On the contrary, in Example 14 compounded with the resin D as an indene-containing $C_9$ resin having a softening point of 170° C. (indene content: 70 mass %), E' at 120° C. is 150 and the running stability is considerably improved.

With respect to these results, Comparative Example 7 compounded with the resin I having a softening point of 140° C. improves the running stability while maintaining the initial gripping performance. Further, when the resin D as an indene-containing $C_9$ resin is used together, the running stability is largely improved without damaging the initial gripping performance (Examples 16-18).

Also, in tires of Example 19 wherein 30 parts by mass of the resin F as an indene-containing $C_9$ resin (indene content: 70 mass %, softening point: 170° C.) and 30 parts by mass of the hydrogenated petroleum resin (softening point: 140° C.) are compounded into the rubber composition and Example 20 wherein 30 parts by mass of the resin G as an indene-containing $C_9$ resin containing $C_5$ component and 30 parts by mass of the hydrogenated petroleum resin (softening point: 140° C.) are compounded into the rubber composition, E' at 120° C., initial gripping performance and running stability are improved simultaneously. Therefore, the tire of the invention is preferable to include at least one resin selected from homopolymer resin and copolymer resin of an aromatic vinyl compound having a softening point of not lower than 135° C. in addition to the indene-containing $C_9$-based resin having a softening point of 130° C.-190° C. and an indene content of 30-80 mass %.

Comparative Examples 9-11 and Example 21-30

A rubber composition is prepared by milling components according to a compounding recipe (unit: parts by mass) shown in Table 3 in a Banbury mixer. Also, a tire to be tested is prepared by using such a rubber composition to form a tread of a passenger car tire (size: 225/40R18). Thereafter, the dry gripping property and so on are evaluated by the above methods with respect to the resulting rubber compositions and tires to be tested. The results are shown in Table 3.

TABLE 3

| | | Comparative Example 9 | Comparative Example 10 | Example 21 | Example 22 | Example 23 | Example 24 | Example 25 |
|---|---|---|---|---|---|---|---|---|
| Compounding recipe | SBR *1 | 135 | 135 | 135 | 135 | 135 | 135 | 135 |
| | SBR *2 | | | | | | | |
| | carbon black *3 | 80 | 80 | 80 | 80 | 80 | 80 | 80 |
| | aromatic oil *4 | 15 | 15 | 15 | 15 | 15 | 15 | 15 |
| | zinc oxide | 3 | 3 | 3 | 3 | 3 | 3 | 3 |
| | stearic acid | 2 | 2 | 2 | 2 | 2 | 2 | 2 |
| | wax *5 | 1.5 | 1.5 | 1.5 | 1.5 | 1.5 | 1.5 | 1.5 |
| | antioxidant *6 | 2 | 2 | 2 | 2 | 2 | 2 | 2 |
| | resin K *19 | 50 | | | 25 | | | |
| | resin L *20 | | 50 | | | 40 | 25 | 10 |

TABLE 3-continued

| | | | | | | | | |
|---|---|---|---|---|---|---|---|---|
| | resin D *10 | | | 50 | 25 | 10 | 25 | 40 |
| | resin M *21 | | | | | | | |
| | vulcanization accelerator C (DPG) *22 | 0.3 | 0.3 | 0.3 | 0.3 | 0.3 | 0.3 | 0.3 |
| | vulcanization accelerator D (DM) *23 | 1 | 1 | 1 | 1 | 1 | 1 | 1 |
| | vulcanization accelerator A (CZ) *14 | 1 | 1 | 1 | 1 | 1 | 1 | 1 |
| | sulfur | 2 | 2 | 2 | 2 | 2 | 2 | 2 |
| Property of rubber composition | E' at 120° C. (index) | 100 | 109 | 163 | 107 | 120 | 129 | 138 |
| Actual test on vehicle | initial gripping performance | 3 | 3 | −3 | 3 | 3 | 3 | 1 |
| | running stability | −3 | −2 | 3 | 1 | 0 | 2 | 3 |

| | | Comparative Example 11 | Example 26 | Example 27 | Example 28 | Example 29 | Example 30 |
|---|---|---|---|---|---|---|---|
| Compounding recipe | SBR *1 | 135 | | | | | |
| | SBR *2 | | 150 | 150 | 150 | 150 | 150 |
| | carbon black *3 | 80 | 70 | 70 | 70 | 100 | 120 |
| | aromatic oil *4 | 15 | | | | 30 | 50 |
| | zinc oxide | 3 | 3 | 3 | 3 | 3 | 3 |
| | stearic acid | 2 | 2 | 2 | 2 | 2 | 2 |
| | wax *5 | 1.5 | 1.5 | 1.5 | 1.5 | 1.5 | 1.5 |
| | antioxidant *6 | 2 | 2 | 2 | 2 | 2 | 2 |
| | resin K *19 | | | | | | |
| | resin L *20 | 25 | 40 | 25 | 10 | 40 | 40 |
| | resin D *10 | | 10 | 25 | 40 | 10 | 10 |
| | resin M *21 | 25 | | | | | |
| | vulcanization accelerator C (DPG) *22 | 0.3 | 0.3 | 0.3 | 0.3 | 0.3 | 0.3 |
| | vulcanization accelerator D (DM) *23 | 1 | 1 | 1 | 1 | 1 | 1 |
| | vulcanization accelerator A (CZ) *14 | 1 | 1 | 1 | 1 | 1 | 1 |
| | sulfur | 2 | 2 | 2 | 2 | 2 | 2 |
| Property of rubber composition | E' at 120° C. (index) | 152 | 125 | 132 | 140 | 128 | 130 |
| Actual test on vehicle | initial gripping performance | −1 | 3 | 2 | 2 | 3 | 3 |
| | running stability | 2 | 1 | 2 | 3 | 2 | 2 |

*1-*14 are the same as in Table 1.
*19: CLEARON P125 made by Yasuhara Chemical Co., Ltd. hydrogenated terpene resin, softening point: 125° C.
*20: CLEARON P150 made by Yasuhara Chemical Co., Ltd. hydrogenated terpene resin, softening point: 150° C.
*21: NOBARES C160 made by Rutgers Chemicals Co., Ltd. cumarone-indene resin, softening point: 160° C.,
*22: diphenyl guanidine, made by Sumitomo Chemical Co., Ltd.
*23: bis(4-methylbenzylthiazolyl-2)disulfide, made by Sanshin Chemical Industry Co., Ltd.

In Comparative Example 9 that only the hydrogenated terpene rein having a softening point of 125° C. is compounded into the rubber composition, the initial gripping performance is very good, but the running stability is low because the drop of the gripping during the running is large. Even in Comparative Example 10 that the hydrogenated terpene resin having a softening point of 150° C. is compounded into the rubber composition is obtained the similar result. This is considered due to the fact that the resin enhances the compatibility with the polymer through hydrogenation and hence the rubber composition compounded with the hydrogenated resin becomes low in the elastic modulus. In Example 21 that the indene-containing $C_9$ resin having a softening point of 160° C. is compounded into the rubber composition, E' at 120° C. is 160 and the running stability is considerably improved.

On the other hand, in Examples 23-30 wherein the hydrogenated terpene resin having a softening point of 150° C. and α-methylstyrene-vinyl toluene-indene copolymer resin having a softening point of 160° C. are combined and compounded into the rubber composition, E' at 120° C. is improved and the running stability is improved while maintaining the initial gripping performance.

Comparative Examples 12-17 and Examples 31-37

A rubber composition is prepared by milling components according to a compounding recipe (unit: parts by mass) shown in Table 4 in a Banbury mixer. Also, a tire to be tested is prepared by using such a rubber composition to form a tread of a passenger car tire (size: 225/40R18). Thereafter, the dry gripping property and so on are evaluated by the above methods with respect to the resulting rubber compositions and tires to be tested. The results are shown in Table 4.

TABLE 4

|  |  | Comparative Example 12 | Comparative Example 13 | Comparative Example 14 | Comparative Example 15 | Comparative Example 16 | Example 31 | Example 32 |
|---|---|---|---|---|---|---|---|---|
| Compounding recipe | SBR *24 | 100 | 100 | 100 | 100 | 100 | 100 | 100 |
|  | carbon black *25 | 100 | 100 | 100 | 100 | 100 | 100 | 100 |
|  | aromatic oil*4 | 100 | 40 | 40 | 10 | 40 | 40 | 10 |
|  | resin N *26 |  | 60 |  |  |  |  |  |
|  | resin O *27 |  |  | 60 | 90 |  |  |  |
|  | resin P *28 |  |  |  |  | 60 |  |  |
|  | resin D *10 |  |  |  |  |  | 60 | 90 |
|  | wax *5 | 1.0 | 1.0 | 1.0 | 1.0 | 1.0 | 1.0 | 1.0 |
|  | antioxidant *6 | 1.0 | 1.0 | 1.0 | 1.0 | 1.0 | 1.0 | 1.0 |
|  | vulcanization accelerator D (DM) *23 | 1.5 | 1.5 | 1.5 | 1.5 | 1.5 | 1.5 | 1.5 |
|  | zinc oxide | 3.0 | 3.0 | 3.0 | 3.0 | 3.0 | 3.0 | 3.0 |
|  | sulfur | 1.8 | 1.8 | 1.8 | 1.8 | 1.8 | 1.8 | 1.8 |
| Properties of rubber composition | E' at 30° C. | 100 | 200 | 220 | 350 | 180 | 300 | 400 |
|  | E' at 100° C. | 100 | 120 | 120 | 130 | 110 | 200 | 250 |
| Actual test on vehicle | initial griiping performance | 3 | 3 | 3 | −2 | 3 | −1 | −3 |
|  | running stability | −3 | −3 | −2 | −2 | −3 | 3 | 2 |
|  | resistance to thermal fatigue | −3 | −2 | −2 | −1 | −3 | 0 | 0 |

|  |  | Example 33 | Example 34 | Example 35 | Example 36 | Example 37 | Comparative Example 17 |
|---|---|---|---|---|---|---|---|
| Compounding recipe | SBR *24 | 100 | 100 | 100 | 100 | 100 | 100 |
|  | carbon black *25 | 100 | 100 | 100 | 100 | 100 | 100 |
|  | aromatic oil *4 |  | 40 | 40 | 40 | 40 | 40 |
|  | resin N *26 |  |  |  |  | 50 |  |
|  | resin O *27 | 50 | 10 | 30 | 50 |  | 50 |
|  | resin P *28 |  |  |  |  |  | 50 |
|  | resin D *10 | 50 | 50 | 30 | 10 | 50 |  |
|  | wax *5 | 1.0 | 1.0 | 1.0 | 1.0 | 1.0 | 1.0 |
|  | antioxidant *6 | 1.0 | 1.0 | 1.0 | 1.0 | 1.0 | 1.0 |
|  | vulcanization accelerator D (DM) *23 | 1.5 | 1.5 | 1.5 | 1.5 | 1.5 | 1.5 |
|  | zinc oxide | 3.0 | 3.0 | 3.0 | 3.0 | 3.0 | 3.0 |
|  | sulfur | 1.8 | 1.8 | 1.8 | 1.8 | 1.8 | 1.8 |
| Properties of rubber composition | E' at 30° C. | 390 | 270 | 250 | 230 | 230 | 230 |
|  | E' at 100° C. | 200 | 180 | 160 | 145 | 140 | 120 |
| Actual test on vehicle | initial griiping performance | 2 | 1 | 3 | 3 | 3 | 3 |
|  | running stability | 2 | 3 | 3 | 0 | −1 | −3 |
|  | resistance to thermal fatigue | 0 | 0 | 0 | 0 | −1 | −2 |

*4-*23 are the same as in Tables 1-3.
*24: 1712 made by JSR Corporation (styrene content: 23.5%, 37.5% aromatic oil extended)
*25: SEAST 9H made by Tokai Carbon Co., Ltd. (nitrogen adsorption specific surface area (N$_2$SA) = 142 m$^2$/g, dibutyl phthalate absorption = 130 ml/100 g)
*26: YS POLYSTAR T115 made by Yasuhara Chemical Co., Ltd. terpene-phenol copolymer resin, softening point: 115° C.
*27: YS POLYSTAR T160 made by Yasuhara Chemical Co., Ltd. terpene-phenol copolymer resin, softening point: 160° C., OH value: 70
*28: NEOPOLYMER L90 made by Nippon Petrochemicals Co., Ltd. indene-containing C$_9$ resin (indene content: 38 mass %), softening point: 90° C.

When only the terpene-phenol copolymer resin is compounded into the rubber composition, E' at 100° C. is low and the tire performances (resistance to thermal fatigue and running stability) are not improved when the tire temperature is raised (Comparative Examples 13, 14). As the amount of such a resin compounded into the rubber composition is increased, the elastic modulus at a high temperature (E' at 100° C.) rises, but also the elastic modulus at a low temperature (E' at 30° C.) rises, so that the initial gripping performance of the tire lowers (Comparative Example 15).

When C$_9$ resin having a low softening point is compounded into the rubber composition alone (Comparative Example 16), E' at 100° C. is not improved likewise the terpene-phenol copolymer resin. Also, when the terpene-phenol copolymer resin (softening point: 160° C., OH value: 70) and the indene-containing C$_9$ resin (indene content: 38 mass %, softening point: 90° C.) are compounded into the rubber composition (Comparative Example 17), the initial gripping performance is improved, but the running stability and resistance to thermal fatigue are deteriorated. On the other hand, in Example 37 compounded with the indene-containing C$_9$ resin and terpene-phenol copolymer resin, the initial gripping performance is excellent. Therefore, the rubber composition of the invention is preferable to further include at least one resin selected from hydrogenated terpene-phenol copolymer resins having a softening point of not lower than 130° C. formed by partially or fully hydrogenating terpene-phenol copolymer resin.

When the indene-containing $C_9$ resin having a high softening point and the terpene-phenol copolymer resin having a high softening point are combined and compounded into the rubber composition, it has been confirmed to improve the dry gripping property while maintaining E' at 100° C. and resistance to thermal fatigue (Examples 33-36). However, when the amount of the terpene-phenol copolymer resin having a high softening point compounded into the rubber composition is large (Example 36), the running stability becomes lower than those of the other examples (Examples 34 and 35), while when the amount of the indene-containing $C_9$ resin compounded into the rubber composition is large (Example 34), the initial gripping performance becomes lower than those of the other examples (Examples 35, 36).

Examples 38-59

A rubber composition for a tire tread is prepared by milling components according to a compounding recipe (parts by mass) shown in Tables 5-7 in a Banbury mixer. The resulting rubber composition is vulcanized under conditions of 160° C. and 15 minutes, and then the gripping performance is evaluated. Moreover, the evaluation of the gripping performance of the tire is carried out by the aforementioned method. The evaluation results are also shown in Tables 5-7.

TABLE 5

| | | Example 38 | Example 39 | Example 40 | Example 41 | Example 42 | Example 43 | Example 44 | Example 45 |
|---|---|---|---|---|---|---|---|---|---|
| Compounding recipe (parts by mass) | styrene-butadiene copolymer rubber *2 | 150 | 150 | 150 | 150 | 150 | 150 | 150 | 150 |
| | carbon black *29 | 80 | 80 | 80 | 80 | 80 | 80 | 80 | 80 |
| | stearic acid | 2 | 2 | 2 | 2 | 2 | 2 | 2 | 2 |
| | resin D *10 | 10 | 10 | 10 | 10 | 10 | 10 | 10 | 10 |
| | resin Q *30 | 40 | | | | | | | |
| | resin R *31 | | 40 | | | | | | |
| | resin S *32 | | | 40 | | | | | |
| | resin T *33 | | | | 40 | | | | |
| | resin U *28 | | | | | 40 | | | |
| | resin V *34 | | | | | | 40 | | |
| | resin W *35 | | | | | | | 40 | |
| | resin X *36 | | | | | | | | 40 |
| | zinc oxide | 3 | 3 | 3 | 3 | 3 | 3 | 3 | 3 |
| | antioxidant *6 | 1 | 1 | 1 | 1 | 1 | 1 | 1 | 1 |
| | vulcanization accelerator E *37 | 1 | 1 | 1 | 1 | 1 | 1 | 1 | 1 |
| | vulcanization accelerator F *38 | 1 | 1 | 1 | 1 | 1 | 1 | 1 | 1 |
| | sulfur | 2 | 2 | 2 | 2 | 2 | 2 | 2 | 2 |
| Evaluation results | tan δ (50° C.) | 100.0 | 100.5 | 99.7 | 101.0 | 100.4 | 96.5 | 96.6 | 102.0 |
| | dry skid property | 100.0 | 99.8 | 102.2 | 101.5 | 102.0 | 97.3 | 101.0 | 99.4 |
| | gripping property | 4 | 5 | 4 | 4 | 4 | 3 | 3 | 3 |

TABLE 6

| | | Example 46 | Example 47 | Example 48 | Example 49 | Example 50 | Example 51 | Example 52 | Example 53 |
|---|---|---|---|---|---|---|---|---|---|
| Compounding recipe (parts by mass) | styrene-butadiene copolymer rubber *2 | 150 | 150 | 150 | 150 | 150 | 150 | 150 | 150 |
| | carbon black *29 | 80 | 80 | 80 | 80 | 80 | 80 | 80 | 80 |
| | stearic acid | 2 | 2 | 2 | 2 | 2 | 2 | 2 | 2 |
| | resin D *10 | 10 | 10 | 10 | 10 | 10 | 10 | 10 | 10 |
| | resin Q *30 | 60 | 38.5 | 25 | 25 | 25 | 25 | 25 | 25 |
| | resin R *31 | | | | | | | | |
| | resin S *32 | 40 | 1.5 | 15 | | | | | |
| | resin T *33 | | | | 15 | | | | |
| | resin U *28 | | | | | 15 | | | |
| | resin V *34 | | | | | | 15 | | |
| | resin W *35 | | | | | | | 15 | |
| | resin X *36 | | | | | | | | 15 |
| | zinc oxide | 3 | 3 | 3 | 3 | 3 | 3 | 3 | 3 |

TABLE 6-continued

|  |  | Example 46 | Example 47 | Example 48 | Example 49 | Example 50 | Example 51 | Example 52 | Example 53 |
|---|---|---|---|---|---|---|---|---|---|
|  | antioxidant *6 | 1 | 1 | 1 | 1 | 1 | 1 | 1 | 1 |
|  | vulcanization accelerator E *37 | 1 | 1 | 1 | 1 | 1 | 1 | 1 | 1 |
|  | vulcanization accelerator F *38 | 1 | 1 | 1 | 1 | 1 | 1 | 1 | 1 |
|  | sulfur | 2 | 2 | 2 | 2 | 2 | 2 | 2 | 2 |
| Evaluation results | tan δ (50° C.) | 102.8 | 104.0 | 104.2 | 105.2 | 106.3 | 102.2 | 102.0 | 106.5 |
|  | dry skid property | 104.5 | 102.3 | 107.6 | 106.8 | 107.3 | 103.4 | 104.2 | 102.8 |
|  | gripping property | 5 | — | 6 | 7 | 7 | 4 | 5 | 5 |

TABLE 7

|  |  | Example 54 | Example 55 | Example 56 | Example 57 | Example 58 | Example 59 |
|---|---|---|---|---|---|---|---|
| Compounding recipe (parts by mass) | styrene-butadiene copolymer rubber *2 | 150 | 150 | 150 | 150 | 150 | 150 |
|  | carbon black *29 | 80 | 80 | 80 | 80 | 80 | 80 |
|  | stearic acid | 2 | 2 | 2 | 2 | 2 | 2 |
|  | resin D *10 | 10 | 10 | 10 | 10 | 10 | 10 |
|  | resin Q *30 |  |  |  |  |  |  |
|  | resin R *31 | 25 | 25 | 25 | 25 | 25 | 25 |
|  | resin S *32 | 15 |  |  |  |  |  |
|  | resin T *33 |  | 15 |  |  |  |  |
|  | resin U *28 |  |  | 15 |  |  |  |
|  | resin V *34 |  |  |  | 15 |  |  |
|  | resin W *35 |  |  |  |  | 15 |  |
|  | resin X *36 |  |  |  |  |  | 15 |
|  | zinc oxide | 3 | 3 | 3 | 3 | 3 | 3 |
|  | antioxidant *6 | 1 | 1 | 1 | 1 | 1 | 1 |
|  | vulcanization accelerator E *37 | 1 | 1 | 1 | 1 | 1 | 1 |
|  | vulcanization accelerator F *38 | 1 | 1 | 1 | 1 | 1 | 1 |
|  | sulfur | 2 | 2 | 2 | 2 | 2 | 2 |
| Evaluation results | tan δ (50° C.) | 105.2 | 106.4 | 107.0 | 101.2 | 102.0 | 107.5 |
|  | dry skid property | 112.3 | 110.8 | 112.0 | 103.8 | 105.8 | 103.8 |
|  | gripping property | 7 | 7 | 7 | 4 | 5 | 5 |

*2-*10 are the same as in Table 1.
*29: carbon black (external surface area by CTAB adsorption process: 148 $m^2$/g, 24M4DBP absorption: 102 mL/100 g)
*30: KORESIN (made by BASF)
*31: DUREZ 32333 (made by Durez, p-tert-butylphenol-formaldehyde resin, softening point: 130° C.)
*32: terpene-phenol copolymer resin, YS POLYSTAR S145 (made by Yasuhara Chemical Co., Ltd. softening point: 145° C., OH value: 120)
*33: terpene-phenol copolymer resin, YS POLYSTAR T145 (made by Yasuhara Chemical Co., Ltd. softening point: 145° C., OH value: 70)
*34: terpene-phenol copolymer resin, YS POLYSTAR S100 (made by Yasuhara Chemical Co., Ltd. softening point: 100° C., OH value: 70)
*35: terpene-phenol copolymer resin, MAITYACE K125 (made by Yasuhara Chemical Co., Ltd. softening point: 125° C., OH value: 210)
*36: terpene resin, CLEARON P150 (made by Yasuhara Chemical Co., Ltd. softening point: 150° C., OH value: 0)
*37: N-t-butyl-2-benzothiazyl-sulfenamide
*38: tetrakis-2-ethylhexylthiuram disulfide Tires wherein a rubber composition comprising the indene-containing $C_9$-based resin, at least one resin (A) selected from the alkyl-phenol resins and at least one resin (B) selected from the terpene homopolymer resin and terpene-phenol copolymer resins is used in a tread (Examples 46-59) are high in the tan δ value at 50° C. and good in the dry skid property as compared with tires wherein a rubber composition comprising the indene-containing $C_9$-based resin and either at least one resin (A) selected from the alkyl-phenol resins or at least one resin (B) selected from the terpene homopolymer resin and terpene-phenol copolymer resins is used in a tread (Examples 38-45). Therefore, the rubber composition of the invention is preferable to further include at least one resin (A) selected from the alkyl-phenol resins and at least one resin (B) selected from the terpene homopolymer resin and terpene-phenol copolymer resins in addition to the indene-containing $C_9$-based resin.

The invention claimed is:

1. A rubber composition formed by compounding an indene-containing $C_9$-based resin having a softening point of 130° C.-190° C. and an indene content of 30-80 mass % into a rubber component, which further includes at least one resin selected from (i) hydrogenated petroleum resins having a softening point of not lower than 120° C. by partially or fully hydrogenating a petroleum resin comprising $C_5$ component and/or $C_9$ component, (ii) hydrogenated terpene resins having a softening point of not lower than 130° C. by partially or fully hydrogenating terpene homopolymer resin, and (iii) terpene-phenol copolymer resin.

2. A rubber composition according to claim 1, wherein an amount of the indene-containing $C_9$-based resin compounded is 5-80 parts by mass per 100 parts by mass of the rubber component.

3. A rubber composition according to claim 1, wherein the indene-containing $C_9$-based resin contains $C_5$ component.

4. A rubber composition according to claim 3, wherein a content of the $C_5$ component in the indene-containing $C_9$-based resin is 0.5-20 mass %.

5. A rubber composition according to claim 1, wherein the softening point of the indene-containing $C_9$-based resin is 140-180° C.

6. A rubber composition according to claim 5, wherein the indene-containing $C_9$-based resin is α-methylstyrene-vinyl toluene-indene copolymer resin having a softening point of 155-180° C.

7. A rubber composition according to claim 1, which further includes at least one resin selected from homopolymer resin and copolymer resin of an aromatic vinyl compound having a softening point of not lower than 135° C.

8. A rubber composition according to claim 1, which includes at least one resin selected from hydrogenated petroleum resins having a softening point of not lower than 120° C. by partially or fully hydrogenating a petroleum resin comprising $C_5$ component and/or $C_9$ component.

9. A rubber composition according to claim 1, which includes at least one resin selected from hydrogenated terpene resins having a softening point of not lower than 130° C. by partially or fully hydrogenating terpene resin.

10. A rubber composition according to claim 9, wherein the softening point of the hydrogenated terpene resin is not lower than 140° C.

11. A rubber composition according to claim 1, which includes at least one resin selected from terpene homopolymer resin and terpenephenol copolymer resin.

12. A rubber composition according to claim 1, which further includes at least one resin (A) selected from alkylphenol resins and at least one resin (B) selected from terpene homopolymer resin and terpene-phenol copolymer resin.

13. A rubber composition according to claim 12, wherein the resin (A) and the resin (B) are compounded in a mass ratio of 10:1-1:10.

14. A rubber composition according to claim 12, wherein a total amount of the resin (A) and the resin (B) compounded is 3-100 parts by mass per 100 parts by mass of the rubber component.

15. A rubber composition according to claim 12, wherein a main structure of phenol site in the resin (A) is p-tert-butylphenol structure.

16. A rubber composition according to claim 12, wherein the resin (B) includes at least terpene-phenol copolymer resin, and OH value of the terpene-phenol copolymer resin is not less than 170.

17. A rubber composition according to claim 12, wherein the resin (A) has a softening point of not lower than 120° C.

18. A rubber composition according to claim 1, wherein the rubber component comprises not less than 70% by mass of a butadiene-based copolymer having a vinyl bond content in butadiene portion of not less than 10%.

19. A rubber composition according to claim 18, wherein the butadiene-based copolymer comprises styrene-butadiene copolymer.

20. A rubber composition according to claim 19, wherein the styrene-butadiene copolymer has a styrene content of 20-70 mass %.

21. A rubber composition according to claim 1, which further includes carbon black in an amount of 60-200 parts by mass per 100 parts by mass of the rubber component.

22. A pneumatic tire characterized by using a rubber composition as claimed in claim 1 in a tread rubber.

* * * * *